(12) United States Patent
Koziy et al.

(10) Patent No.: US 8,583,100 B2
(45) Date of Patent: Nov. 12, 2013

(54) DISTRIBUTED REMOTE BASE STATION SYSTEM

(75) Inventors: Robert J. Koziy, Burnsville, MN (US); Harold A. Roberts, Eden Prairie, MN (US); Todd Schieffert, Edina, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 1465 days.

(21) Appl. No.: 11/627,255

(22) Filed: Jan. 25, 2007

(65) Prior Publication Data

US 2008/0181171 A1    Jul. 31, 2008

(51) Int. Cl.
*H04W 4/00*    (2009.01)

(52) U.S. Cl.
USPC ......... 455/422.1; 455/3.01; 455/561; 455/16; 370/315

(58) Field of Classification Search
USPC ............... 455/550.1, 561, 562.1, 575.7, 3.01, 455/422.1; 370/315, 319
See application file for complete search history.

(56) References Cited

U.S. PATENT DOCUMENTS

| | | | |
|---|---|---|---|
| 3,931,473 A | 1/1976 | Ferris, Jr. | |
| 4,101,834 A | 7/1978 | Stutt et al. | |
| 4,112,488 A | 9/1978 | Smith, III | |
| 4,144,409 A | 3/1979 | Utano et al. | |
| 4,144,411 A | 3/1979 | Frenkiel | |
| 4,183,054 A | 1/1980 | Patisaul et al. | |
| 4,231,116 A | 10/1980 | Sekiguchi et al. | |
| 4,244,046 A | 1/1981 | Brouard et al. | |
| 4,354,167 A | 10/1982 | Terreault et al. | |
| 4,402,076 A | 8/1983 | Krajewski | |
| 4,451,699 A | 5/1984 | Gruenberg | |
| 4,451,916 A | 5/1984 | Casper et al. | |
| 4,456,793 A | 6/1984 | Baker et al. | |
| 4,475,010 A | 10/1984 | Huensch et al. | |
| 4,485,486 A | 11/1984 | Webb et al. | |
| 4,525,861 A | 6/1985 | Freeburg | |
| 4,531,239 A | 7/1985 | Usui | |
| 4,556,760 A | 12/1985 | Goldman | |
| 4,596,051 A | 6/1986 | Feldman | |
| 4,611,323 A | 9/1986 | Hessenmuller | |
| 4,613,990 A | 9/1986 | Halpern | |
| 4,628,501 A | 12/1986 | Loscoe | |
| 4,654,843 A | 3/1987 | Roza et al. | |
| 4,667,319 A | 5/1987 | Chum | |

(Continued)

FOREIGN PATENT DOCUMENTS

| | | |
|---|---|---|
| CA | 2008900 | 1/1998 |
| DE | 3707244 A | 9/1988 |

(Continued)

OTHER PUBLICATIONS

Wala, "A New Microcell Architecture Using Digital Optical Transport", "43rd IEEE Vehicular Technology Conference, Personal Communication—Freedom Through Wireless Technology", May 18-20, 1993, pp. 585-588, Publisher: IEEE, Published in: US.

(Continued)

*Primary Examiner* — Vladimir Magloire
(74) *Attorney, Agent, or Firm* — Fogg & Powers LLC

(57) ABSTRACT

A distributed base station system for high speed data transmission is disclosed. The system includes a plurality of remote antennas, each antenna being coupled to a router. The plurality of remote antennas is coupled to each other and is arranged into a network.

20 Claims, 9 Drawing Sheets

(56) References Cited

U.S. PATENT DOCUMENTS

| | | |
|---|---|---|
| 4,669,107 A | 5/1987 | Eriksson-Lennartsson |
| 4,691,292 A | 9/1987 | Rothweiler |
| 4,701,909 A | 10/1987 | Kavehrad et al. |
| 4,704,733 A | 11/1987 | Kawano |
| 4,718,004 A | 1/1988 | Dalal |
| 4,754,451 A | 6/1988 | Eng et al. |
| 4,759,051 A | 7/1988 | Han |
| 4,760,573 A | 7/1988 | Calvignac et al. |
| 4,790,000 A | 12/1988 | Kinoshita |
| 4,794,649 A | 12/1988 | Fujiwara |
| 4,797,947 A | 1/1989 | Labedz |
| 4,816,825 A | 3/1989 | Chan et al. |
| 4,831,662 A | 5/1989 | Kuhn |
| 4,849,963 A | 7/1989 | Kawano et al. |
| 4,916,460 A | 4/1990 | Powell |
| 4,920,533 A | 4/1990 | Dufresne et al. |
| 4,932,049 A | 6/1990 | Lee |
| 4,959,829 A | 9/1990 | Griesing |
| 4,977,593 A | 12/1990 | Ballance |
| 4,999,831 A | 3/1991 | Grace |
| 5,067,147 A | 11/1991 | Lee |
| 5,067,173 A | 11/1991 | Gordon et al. |
| 5,084,869 A | 1/1992 | Russell |
| 5,136,410 A | 8/1992 | Heiling et al. |
| 5,138,440 A | 8/1992 | Radice |
| 5,159,479 A | 10/1992 | Takagi |
| 5,175,867 A | 12/1992 | Wejke et al. |
| 5,193,109 A | 3/1993 | Chien-Yeh Lee |
| 5,243,598 A | 9/1993 | Lee |
| 5,251,053 A | 10/1993 | Heidemann |
| 5,267,261 A | 11/1993 | Blakeney, II et al. |
| 5,272,700 A | 12/1993 | Hansen et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,198 A | 3/1994 | Kay et al. |
| 5,301,056 A | 4/1994 | O'Neill |
| 5,303,287 A | 4/1994 | Laborde |
| 5,303,289 A | 4/1994 | Quinn |
| 5,305,308 A | 4/1994 | English et al. |
| 5,309,474 A | 5/1994 | Gilhousen et al. |
| 5,313,461 A | 5/1994 | Ahl et al. |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,392,453 A | 2/1995 | Gudmundson et al. |
| 5,400,391 A | 3/1995 | Emura et al. |
| 5,442,700 A | 8/1995 | Snell et al. |
| 5,461,627 A | 10/1995 | Rypinski |
| 5,519,691 A | 5/1996 | Darcie et al. |
| 5,545,397 A | 8/1996 | Spielvogel |
| 5,566,168 A | 10/1996 | Dent |
| 5,577,029 A | 11/1996 | Lu et al. |
| 5,586,121 A | 12/1996 | Moura et al. |
| 5,587,734 A | 12/1996 | Lauder et al. |
| 5,603,080 A | 2/1997 | Kallander et al. |
| 5,621,786 A | 4/1997 | Fischer et al. |
| 5,627,679 A | 5/1997 | Iba |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,682,403 A | 10/1997 | Tu et al. |
| 5,708,961 A | 1/1998 | Hylton et al. |
| D391,967 S | 3/1998 | Blais et al. |
| D391,968 S | 3/1998 | Shiozaki |
| 5,732,076 A | 3/1998 | Ketseoglou et al. |
| 5,734,699 A | 3/1998 | Lu et al. |
| 5,734,979 A | 3/1998 | Lu |
| 5,761,195 A | 6/1998 | Lu et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Van der Kaay et al. |
| 5,781,541 A | 7/1998 | Schneider |
| 5,781,582 A | 7/1998 | Sage et al. |
| 5,781,859 A | 7/1998 | Beasley |
| D397,693 S | 9/1998 | Blias et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,818,824 A | 10/1998 | Lu et al. |
| 5,822,324 A | 10/1998 | Kostresti et al. |
| 5,842,138 A | 11/1998 | Lu et al. |
| 5,852,651 A | 12/1998 | Fischer et al. |
| 5,867,535 A | 2/1999 | Phillips |
| 5,878,325 A | 3/1999 | Dail |
| 5,883,882 A | 3/1999 | Schwartz |
| 5,887,256 A | 3/1999 | Lu et al. |
| 5,907,544 A | 5/1999 | Rypinski |
| 5,930,682 A | 7/1999 | Schwartz et al. |
| 5,946,622 A | 8/1999 | Bojeryd |
| 5,953,651 A | 9/1999 | Lu et al. |
| 5,969,837 A | 10/1999 | Farber et al. |
| 5,983,070 A | 11/1999 | Georges et al. |
| 5,987,014 A | 11/1999 | Magill et al. |
| 5,999,813 A | 12/1999 | Lu et al. |
| 6,005,884 A | 12/1999 | Cook et al. |
| 6,014,546 A | 1/2000 | Georges et al. |
| 6,034,950 A | 3/2000 | Sauer et al. |
| 6,078,823 A | 6/2000 | Chavez et al. |
| 6,081,716 A | 6/2000 | Lu |
| 6,101,400 A | 8/2000 | Ogaz et al. |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,147,786 A | 11/2000 | Pan |
| 6,157,659 A | 12/2000 | Bird |
| 6,157,810 A | 12/2000 | Georges et al. |
| 6,169,907 B1 | 1/2001 | Chang et al. |
| 6,173,177 B1 | 1/2001 | Lu et al. |
| 6,181,687 B1 | 1/2001 | Bisdikian |
| 6,188,693 B1 | 2/2001 | Murakami |
| 6,192,216 B1 | 2/2001 | Sabat, Jr. et al. |
| 6,198,558 B1 | 3/2001 | Graves et al. |
| 6,212,395 B1 | 4/2001 | Lu et al. |
| 6,222,660 B1 | 4/2001 | Traa |
| 6,226,274 B1 | 5/2001 | Reese et al. |
| 6,262,981 B1 | 7/2001 | Schmutz |
| 6,269,255 B1 | 7/2001 | Waylett |
| 6,275,990 B1 | 8/2001 | Dapper et al. |
| 6,317,884 B1 | 11/2001 | Eames et al. |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,381,463 B1 | 4/2002 | Tu et al. |
| 6,466,572 B1 | 10/2002 | Ethridge et al. |
| 6,480,551 B1 | 11/2002 | Ohishi et al. |
| 6,486,907 B1 | 11/2002 | Farber et al. |
| 6,498,936 B1 | 12/2002 | Raith |
| 6,535,732 B1 | 3/2003 | McIntosh et al. |
| 6,549,772 B1 | 4/2003 | Chavez et al. |
| 6,553,111 B1 | 4/2003 | Wang |
| 6,556,551 B1 | 4/2003 | Schwartz |
| 6,567,473 B1 | 5/2003 | Tzannes |
| 6,580,924 B1 | 6/2003 | Lu et al. |
| 6,594,496 B2 | 7/2003 | Schwartz |
| 6,597,912 B1 | 7/2003 | Lu et al. |
| 6,640,108 B2 | 10/2003 | Lu et al. |
| 6,658,259 B2 | 12/2003 | McIntosh |
| 6,667,973 B1 | 12/2003 | Gorshe et al. |
| 6,675,004 B1 | 1/2004 | Waylett |
| 6,694,134 B1 | 2/2004 | Lu et al. |
| 6,697,603 B1 | 2/2004 | Lovinggood et al. |
| 6,729,929 B1 | 5/2004 | Sayers et al. |

(56) References Cited

U.S. PATENT DOCUMENTS

| | | | |
|---|---|---|---|
| 6,768,745 B1 | 7/2004 | Gorshe et al. | |
| 6,771,933 B1 | 8/2004 | Eng et al. | |
| 6,785,558 B1 | 8/2004 | Stratford et al. | |
| 6,801,767 B1 | 10/2004 | Schwartz | |
| 6,826,163 B2 | 11/2004 | Mani et al. | |
| 6,826,164 B2 | 11/2004 | Mani et al. | |
| 6,829,477 B1 | 12/2004 | Lu et al. | |
| 6,831,901 B2 | 12/2004 | Millar | |
| 6,847,653 B1 | 1/2005 | Smiroldo | |
| 6,907,048 B1 | 6/2005 | Treadaway et al. | |
| 6,912,409 B2 | 6/2005 | Waylett | |
| 6,917,614 B1 | 7/2005 | Laubach et al. | |
| 6,931,261 B2 | 8/2005 | Waylett et al. | |
| 6,963,552 B2* | 11/2005 | Sabat et al. | 370/338 |
| 6,967,966 B1 | 11/2005 | Donohue | |
| 7,016,308 B1 | 3/2006 | Gallagher | |
| 7,031,335 B1 | 4/2006 | Donohue | |
| 7,035,671 B2 | 4/2006 | Solum | |
| 7,127,175 B2 | 10/2006 | Mani et al. | |
| 7,205,864 B2 | 4/2007 | Schultz, Jr. et al. | |
| 7,215,651 B2 | 5/2007 | Millar | |
| 2002/0027892 A1 | 3/2002 | Sasaki | |
| 2002/0167954 A1 | 11/2002 | Highsmith et al. | |
| 2002/0191565 A1 | 12/2002 | Mani et al. | |
| 2003/0015943 A1 | 1/2003 | Kim et al. | |
| 2003/0040335 A1 | 2/2003 | McIntosh et al. | |
| 2003/0043928 A1 | 3/2003 | Ling et al. | |
| 2003/0143947 A1 | 7/2003 | Lyu | |
| 2004/0008737 A1 | 1/2004 | McClellan | |
| 2004/0010609 A1 | 1/2004 | Vilander et al. | |
| 2004/0037565 A1 | 2/2004 | Young et al. | |
| 2004/0062214 A1 | 4/2004 | Schnack et al. | |
| 2004/0110534 A1* | 6/2004 | Chung et al. | 455/561 |
| 2004/0166898 A1 | 8/2004 | Tajima | |
| 2004/0196834 A1 | 10/2004 | Ofek et al. | |
| 2004/0198453 A1 | 10/2004 | Cutrer et al. | |
| 2005/0084076 A1 | 4/2005 | Dhir et al. | |
| 2005/0088999 A1 | 4/2005 | Waylett et al. | |
| 2005/0147067 A1 | 7/2005 | Mani et al. | |
| 2005/0153712 A1 | 7/2005 | Osaka et al. | |
| 2005/0201323 A1 | 9/2005 | Mani et al. | |
| 2005/0250503 A1 | 11/2005 | Cutrer | |
| 2006/0029171 A1 | 2/2006 | Jensen | |
| 2006/0040615 A1* | 2/2006 | Mohamadi | 455/25 |
| 2006/0111047 A1* | 5/2006 | Louberg et al. | 455/41.2 |
| 2006/0128347 A1 | 6/2006 | Piriyapoksombut et al. | |
| 2006/0221905 A1 | 10/2006 | Behzad et al. | |
| 2006/0283952 A1 | 12/2006 | Wang | |
| 2007/0127383 A1* | 6/2007 | Borella | 370/241 |
| 2008/0014948 A1 | 1/2008 | Scheinert | |
| 2008/0058018 A1 | 3/2008 | Scheinert | |
| 2009/0129314 A1* | 5/2009 | Weniger et al. | 370/328 |

FOREIGN PATENT DOCUMENTS

| | | |
|---|---|---|
| EP | 0166885 | 1/1986 |
| EP | 0346925 | 12/1989 |
| EP | 0368673 | 5/1990 |
| EP | 0391597 | 10/1990 |
| EP | 0468688 | 1/1992 |
| EP | 0664621 | 7/1995 |
| EP | 0876073 | 11/1998 |
| EP | 1739871 | 3/2007 |
| FR | 2345865 | 10/1977 |
| GB | 2253770 | 9/1992 |
| GB | 2289198 | 11/1995 |
| GB | 2315959 | 2/1998 |
| GB | 2320653 | 6/1998 |
| GB | 2347319 | 8/2000 |
| GB | 2386037 | 9/2003 |
| JP | 58164007 | 9/1983 |
| JP | 326031 | 2/1991 |
| JP | 512374 | 1/1993 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9909769 | 2/1999 |
| WO | 9937035 | 7/1999 |
| WO | 0174013 | 10/2001 |
| WO | 0174100 | 10/2001 |
| WO | 03079645 | 9/2003 |
| WO | 2004006602 | 1/2004 |

OTHER PUBLICATIONS

Merrett et al., "A Cordless Access System Using Radio-Over-Fibre Techniques", "41st IEEE Vehicular Technology Conference Gateway to the Future Technology in Motion", May 19, 1991, pp. 921-924, Published in: St.Louis, MO.

Lee et al., "Intelligent Microcell Applications in PCS", "43rd IEEE Vehicular Technology Conference, Personal Communication—Freedom Through Wireless Technology ", May 18, 1993, pp. 722-725, Publisher: Pactel Corporation, Published in: Secaucus, NJ.

Telocator Bulletin, ""ADC Kentrox Introduces CityCell 824, A Replacement for Conventional Cell Sites"", Feb. 1, 1993, Published in: US.

ADC Kentrox, "ADC Kentrox Introducess Innovative Wireless Network Access Solution", Mar. 1, 1993, Published in: US.

"ADC Kentrox Wireless Systems Group Citycell 824—A Positioning White Paper", Mar. 1993, Publisher: Cita Trade Show.

Akos et al., "Direct Bandpass Sampling of Multiple Distinct RF Signals", Jul. 1, 1999, pp. 983-988, vol. 47, Publisher: IEEE Transactions on Communications.

Cox, "A Radio System Proposal for Widespread Low-Power Tetherless Communications", "IEEE Transactions on Communications", Feb. 1991, pp. 324-335, vol. 39, No. 2, Publisher: IEEE.

Ishio, "A Two-Way Wavelength-Division-Multiplexing Transmission and Its Application to a Switched TV-Distribution System", Publisher: Ekectrical Communication Laboratories, Nipon Telegraph and Telephone Corporation , Published in: Yokosuka, Japan.

Ameritech, "Broadband Optical Transport Digital Microcell Connection Service-Interface and Performance Specifications a Technical D", "Cellular Industry", Oct. 1993, pp. 1-26, Publisher: The Day Group.

ADC Kentrox, ""And Now a Few Words from Your Customers"", "Advertising Brochure", Aug. 1992, Published in: US.

City Cell, Cellular Industry The Day Group, "ADC Kentrox Citycell Field Trial Yields Another First—Simultaneous Analog and Digital Calls".

1998 Foxcom Wireless Proprietary Information, "Application Note "RFiber- RF Fiberoptic Links for Wireless Applications"", , pp. 3-11, Published in: US.

Doulas D. Tang, "Fiber Optic Antenna Remoting for Multi-Sector Cellular Cell Sites", Jul. 9, 1993, Published in: US.

Steele, "Towards a High-Capacity Digital Cellular Mobile Radio System", Aug. 1995, Published in: US.

Titch, "Kentrox Boosts Coverage and Capacity", "Telephony", Jan. 25, 1993.

ADC, "First Field Trial Results Exceed Expectations", Mar. 2, 1993, Published in: US.

Kobb, ""Personal Wireless" Special Report/Communications IEEE Spectrum", Jun. 1, 1993, pp. 20-25.

Gupta et al, "Land Mobile Radio Systems—A Tutorial Exposition", "IEEE Communications Magazine", Jun. 1985, pp. 34-45, vol. 23, No. 6, Publisher: IEEE.

Foxcom Wireless Properietary Information, "Litenna In-Building RF Distribution System", 1998, pp. 1-8, Publisher: Foxcom Wireless.

Schneiderman, "Offshore Markets Gain in Size, Competitiveness Even the Smallest Industry Companies Are Expanding Their Global Buisness", "Microwaves and RF", Mar. 1993, pp. 33-39, vol. 32, No. 3, Publisher: Penton Publishing, Inc, Published in: Berea, OH.

"Digital Transport for Cellular", "Microwaves and RF", Feb. 1993, Published in: Portland, OR.

Nakatsugawa et al., "Software Radio Base and Personal Stations for Cellular/PCS Systems", pp. 617-621, Publisher: IEEE.

(56) References Cited

OTHER PUBLICATIONS

Russell, "New Microcell Technology Sets Cellular Carriers Free", "Telephony", Mar. 1993, pp. 40, 42, and 46.
Cellular Industry, The Day Group, "New Signal Transport Technology Digitizes the Cellular Band".
"Tektronix Synchronous Optical Network (SONET)", "http://www.iec.org/online/tutorials/sonet/topic03.html", 2002, Publisher: International Engineering Consortium.
David Russel, "New Microcell Technology Sets Cellular Carriers Free", Mar. 1993, Published in: US.
GTE Laboratories, "Urban Microcell System Layout", , Published in: US.
O'Byrne, "TDMA and CDMA in a Fiber-Optic Environment", "Vehicular Technology Society 42nd VTS Conference Frontiers of Technology From Pioneers to the 21st Century", May 10-13, 1992, pp. 727-731, vol. 2 of 2, Publisher: GTE Laboratories Inc., Published in: Denver, CO.
Zonemaster, "Maximum Coverage for High-Capacity Locations", "1993 Decibel Products", 1993, pp. 1-4, Publisher: Decibel Multi Media Microcell System.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
Chinese Patent Office, "First Office Action", "From Foreign Counterpart of U.S. Appl. No. 11/627,251", Jan. 18, 2012, pp. 1-13, Published in: CN.
Chinese Patent Office, "Office Action", "From Foreign Counterpart of U.S. Appl. No. 11/627,251", Aug. 15, 2012, pp. 1-14, Published in: CN.
U.S. Patent and Trademark Office, "Final Office Action", "U.S. Appl. No. 11/627,251", Nov. 22, 2011, pp. 1-8.
U.S. Patent and Trademark Office, "Office Action", "U.S. Appl. No. 11/627,251", Mar. 8, 2010, pp. 1-43.
U.S. Patent and Trademark Office, "Office Action", "U.S. Appl. No. 11/627,251", Nov. 15, 2010, pp. 1-12.
U.S. Patent and Trademark Office, "Office Action", "U.S. Appl. No. 11/627,251", May 31, 2011, pp. 1-9.
U.S. Patent and Trademark Office, "Office Action", "U.S. Appl. No. 11/627,251", Oct. 11, 2012, pp. 1-19.
International Preliminary Examining Authority, "International Preliminary Report on Patentability", "From Foreign Counterpart of U.S. Appl. No. 11/627,251", Aug. 6, 2009, pp. 1-5, Published in: WO.
International Searching Authority, "International Search Report ", "From Foreign Counterpart of U.S. Appl. No. 11/627,251", Mailed Nov. 10, 2008, pp. 1-15, Published in: WO.
"Urban Microcell System Layout", Dec. 3, 2004, pp. 1-13.
Chinese Patent Office, "Notification to Grant Patent Right for Invention", "From Foreign Counterpart of U.S. Appl. No. 11/627,251", Dec. 26, 2012, pp. 1-4, Published in: CN.
U.S. Patent and Trademark Office, "Office Action", "U.S. Appl. No. 11/627,251", Apr. 1, 2013, pp. 1-23.

* cited by examiner

DISTRIBUTED REMOTE BASE STATION SYSTEM

RELATED APPLICATIONS

This application is related to the following commonly assigned applications filed on even date herewith, each of which is hereby incorporated herein by reference:

U.S. patent application Ser. No. 11/627,251, entitled "MODULAR WIRELESS COMMUNICATIONS PLATFORM" (the '828 Application).

BACKGROUND

Traditional wireless communication systems may have distributed antennas to expand the range of a centralized base station. Any signals received by the distributed antennas must be sent back to the centralized base station for processing regardless of where the ultimate destination of the signal is located. This causes unneeded transmission of signals and results in increased latencies for users of the system. Additionally, each remote antenna is required to share capacity with every other antenna connected to the centralized base station. This causes unacceptable disruption of services for some users of the system.

For the reasons stated above, and for other reasons stated below which will become apparent to those skilled in the art upon reading and understanding the present specification, there is a need in the art for a distributed antenna system that effectively and efficiently processes wireless communication signals.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, a distributed base station system for high speed data transmission is disclosed. The system includes a plurality of remote antennas, each antenna being coupled to a router. The plurality of remote antennas is coupled to each other and is arranged into a network.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present apparatus is a modular wireless platform that enables a system facilitator to easily and inexpensively adapt their wireless system for use with different data transport mechanisms, frequency bands, communication technologies, and intelligence distribution. This modular platform is made up of a reconfigurable host unit and a reconfigurable remote unit designed for use in a system with a central node and a plurality of distributed antennas. The host unit is located near the central node and facilitates transmission/reception of information to/from the remote units which are located remotely with an accompanying antenna. The remote units function to transmit/receive transmissions from the host unit and transmit/receive wireless signals over accompanying antenna to mobile costumers.

Host unit and remote unit have a modular design and defined interfaces that allow components to be removed and installed to adapt to the needs of the service providers. Both host and remote unit are designed around a serial radio frequency (SeRF) communicator and have a defined interface where different varieties of digital to analog radio frequency transceiver (DART) modules can be connected and disconnected. There are many different DART modules, and each DART module is designed for a particular technology and frequency band. Thus, technology and frequency band adjustments can be made by simply replacing the DART module in the host unit or remote unit. Additionally, host unit and remote unit are designed to allow different transport mechanisms between the host unit and remote unit. For example, the same host unit and remote unit that use fiber optic for inter-unit transmission can be adapted to use E Band wireless transmission instead of or concurrently with the fiber optic. Finally, wireless processing functionality can be placed all on a base station near the central node, or the functionality can be distributed throughout each of the remote units. The flexibility to modify the functionality of each remote unit allows the wireless platform to support centralized base stations and distributed base stations, either separately or concurrently.

Figure 1:
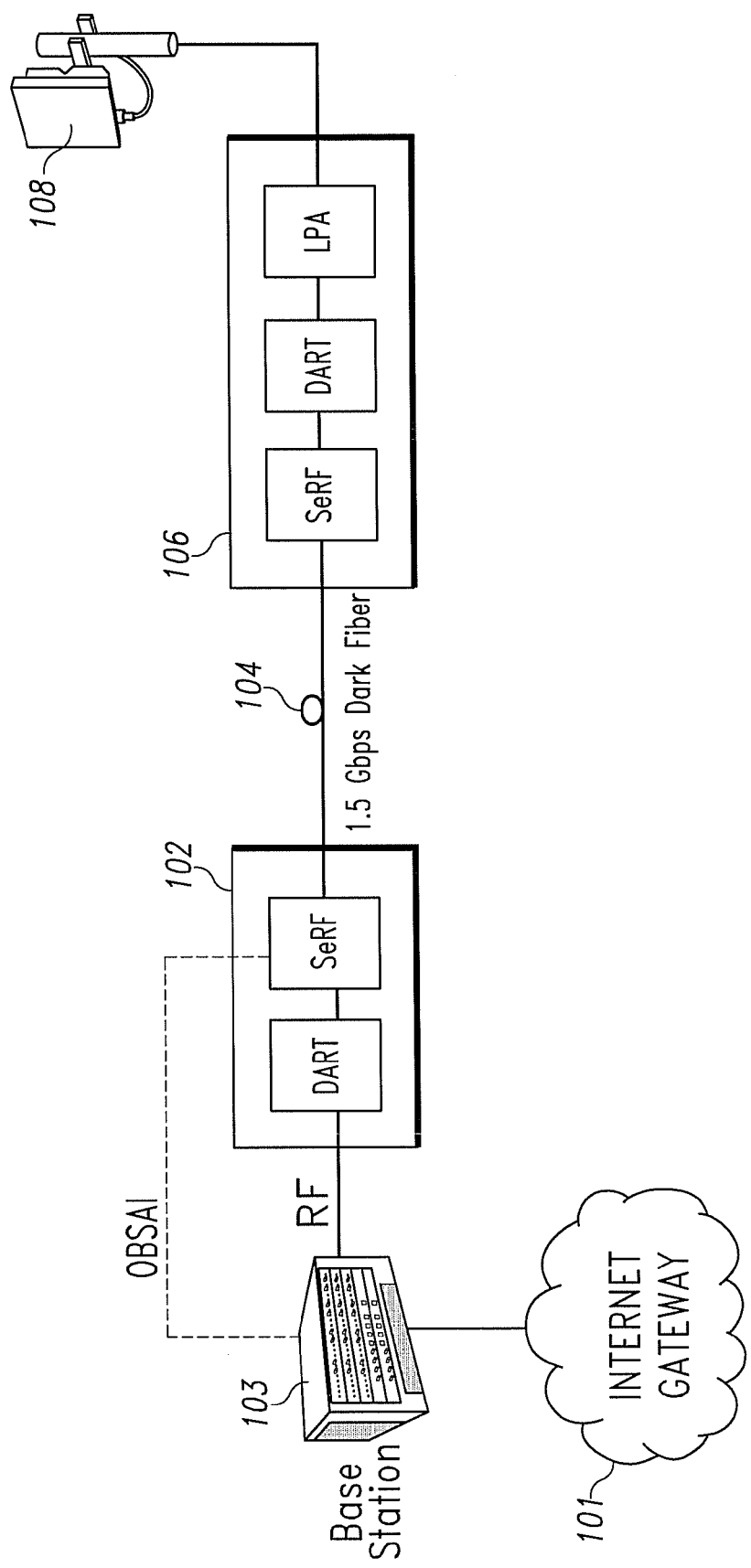
FIG. 1 is an illustration of one embodiment of a system using a universal wireless communications platform.

FIG. 1 is a block diagram of one embodiment of a system 100 using a modular wireless communications platform. System 100 is a field configurable distributed antenna system (DAS) that provides bidirectional transport of a fixed portion of RF spectrum from an Internet Protocol (IP) gateway 101 to a remote antenna 108. Along with IP gateway 101 and remote antenna 108, system 100 includes a base station 103, a host unit 102, a transport mechanism 104, and a remote unit 106. Host unit 102, a modular host transceiver and remote unit 106, a modular remote radio head, work together to transmit and receive data to/from remote antennas. In this embodiment, host unit 102 provides the interface between a base station 101 a signal transport mechanism 104. Remote unit 106 provides the interface between transport mechanism 104 and a remote antenna 108. In this embodiment, signal transport mechanism 104 is an optical fiber, and host unit 102 sends optical signals through the optical fiber to remote unit 106.

In the transmission direction of transport, base station 103 performs baseband processing on IP data from IP gateway and places the IP data onto a channel. In one embodiment base station 103 is an IEEE 802.16 compliant base station. Optionally, base station 103 may also meet the requirements of WiMax, WiBro, or a similar consortium. In another embodiment, base station 103 is an 800 MHz or 1900 MHz base station. In yet another embodiment, the system is a cellular/PCS system and base station 103 communicates with a base station controller. In still another embodiment, base station 103 communicates with a voice/PSTN gateway. Base station 103 also creates the protocol and modulation type for the channel. Base station 103 then converts the IP packetized data into an analog RF signal for transmission over antenna 108. Base station 103 sends the RF signal to host unit 102. Host unit 102 converts the RF signal for long distance high speed transmission over transport mechanism 104. Host unit 102 sends the signal over transport mechanism 104, and the signal is received by remote unit 106. Remote unit 106 converts the received signal back into an RF signal and transmits the signal over antenna 108 to consumer mobile devices.

Figure 2:
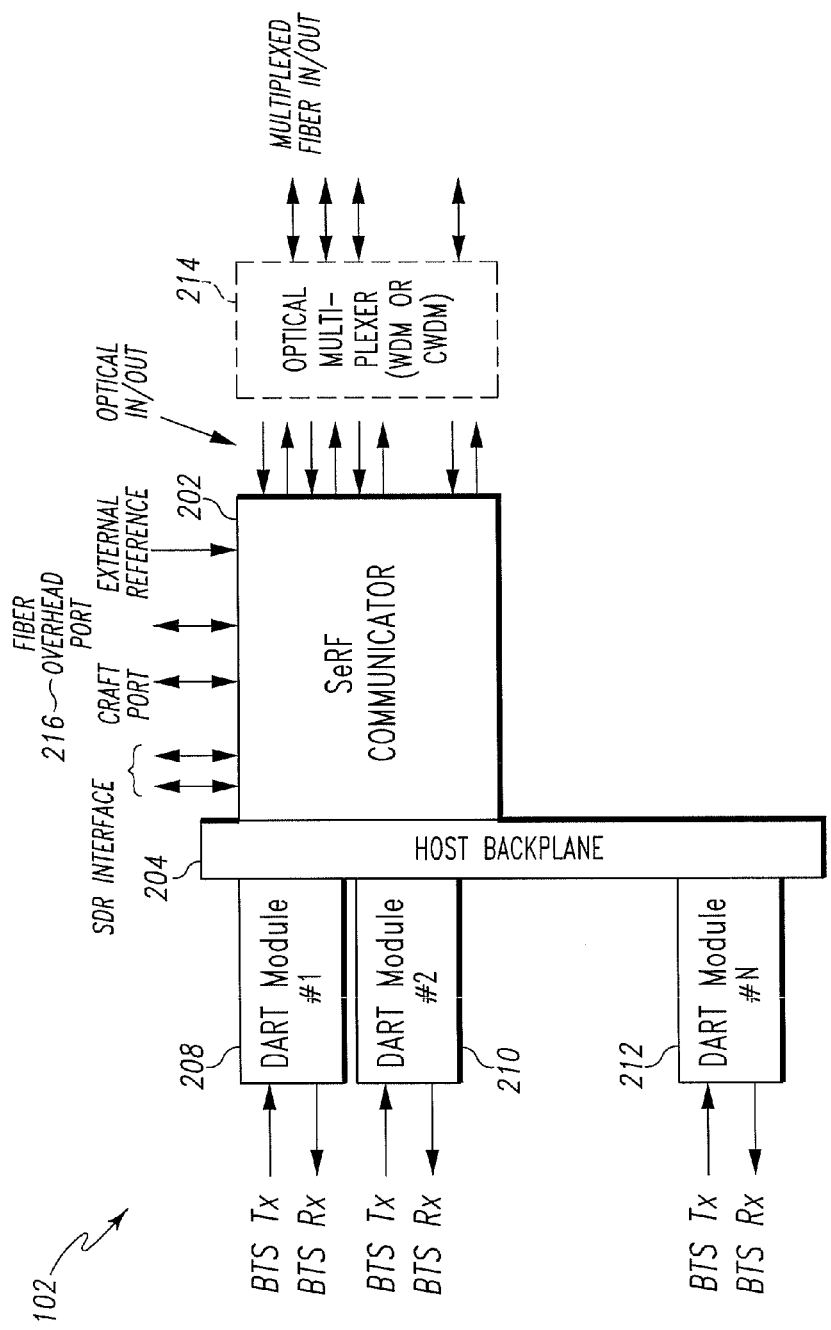
FIG. 2 illustrates a schematic view of one embodiment of a host unit for use in the system of FIG. 1.

FIG. 2 illustrates a schematic diagram of one embodiment of a host unit 102 for use in a modular wireless communications platform. Host unit 102 has a serial radio frequency (SeRF) communicator 202 that is coupled to a digital to analog radio frequency transceiver (DART) interface 204. DART interface 204 has a plurality of DART connectors each of which is configured to receive a pluggable DART module 208. Further, DART connectors are configured to connect DART module 208 to SeRF communicator 202. DART interface 204 is a common interface that is configured to allow communication between SeRF communicator 202 and different varieties of DART modules 208. Additionally, DART interface 204 allows multiple DART modules 208, 210, 212 to connect to a single SeRF communicator 202. In this embodiment, DART interface 204 is a passive host backplane to which SeRF communicator 202 also connects. In this embodiment, DART interface 204 has eight DART connectors for a DART module 208. In another embodiment, instead of being a host backplane, DART interface 204 is integrated with SeRF communicator 202.

DART modules 208, 210, 212 provide bi-directional conversion to/from analog RF signals from/to digital sampled RF. In one direction of communication, DART module 208 receives an incoming analog RF signal from base station 103 and converts the analog signal to a digital signal for use by SeRF communicator 202. In the other direction DART modules 208, 210, 212 receive digital sampled RF data from SeRF communicator 202 and convert the data to analog RF for use by base station 103.

Each DART module 208, 210, 212 has a common communication interface for communication with SeRF communicator 202, and a RF processing portion that is exclusive to one frequency band and communication technology. Each DART module 208, 210, 212, therefore, converts to/from one analog RF to the digital signal used by SeRF communicator. For example, DART module 208 is designed to transmit 850 MHz cellular transmissions. As another example, DART module 210 transmits 1900 MHz PCS signals. Some of the other options for DART modules 208, 210, 212 include Nextel 800 band, Nextel 900 band, PCS full band, PCS half band, BRS, WiMax, and the European GSM 900, DCS 1800, and UMTS 2100. By allowing different varieties of DART modules 208, 210, 212 to be plugged into DART interface 206, host unit 102 is configurable to any of the above frequency bands and technologies as well as any new technologies or frequency bands that are developed. Host unit 102, once installed, is field configurable to transmit a variety desired by insertion of a different DART module. Additionally, since SeRF communicator 202 is configured to communicate with multiple different DART modules 208, 210, 212, a single host unit 102 can transmit/receive multiple frequency bands or technologies.

SeRF communicator 202 provides bi-directional conversion to/from a SeRF stream from/to a high speed optical serial data stream. In one direction, SeRF communicator 202 receives incoming SeRF streams from DART modules 208, 210, 212 and sends a serial optical data stream over transport mechanism 104 to remote unit 106. In the other direction, SeRF communicator 202 receives an optical serial data stream from a remote unit 106 and provides SeRF streams to DART modules 208, 210, 212. In one embodiment, the SeRF stream between DART module 208 and SeRF communicator is a parallel stream. In another embodiment, SeRF stream is a serial data stream.

SeRF communicator 202 also allows multiple DART modules 208, 210, 212 to operate in parallel. SeRF communicator 202 actively multiplexes the signals from each DART module 208, 210, 212 such that they are sent simultaneously over a single transport mechanism 104. To accomplish this, SeRF communicator 202 re-clocks each DART module 208, 210, 212 to ensure synchronization.

In one embodiment, an optical multiplex module 214 is optically coupled to SeRF communicator 202. Optical multiplex module 214 performs multiplexing/de-multiplexing of an optical serial data stream to/from SeRF communicator 202 over transport mechanism 104. In this embodiment, optical multiplex module 214 performs wavelength division multiplexing.

In another embodiment, transport mechanism 104 is a wireless millimeter wave signal transceiver (e.g. E Band/70 GHz radio). In this embodiment, host unit 102 sends optical signals to the millimeter wave transceiver which converts the optical signals into millimeter waves and transmits the millimeter waves to a similar millimeter wave transceiver connected to remote unit 106. In yet another embodiment, transport mechanism 104 is a microwave radio transceiver. In still another embodiment, transport mechanism 104 is a T1 connection for transmission of IP data.

Figure 3:
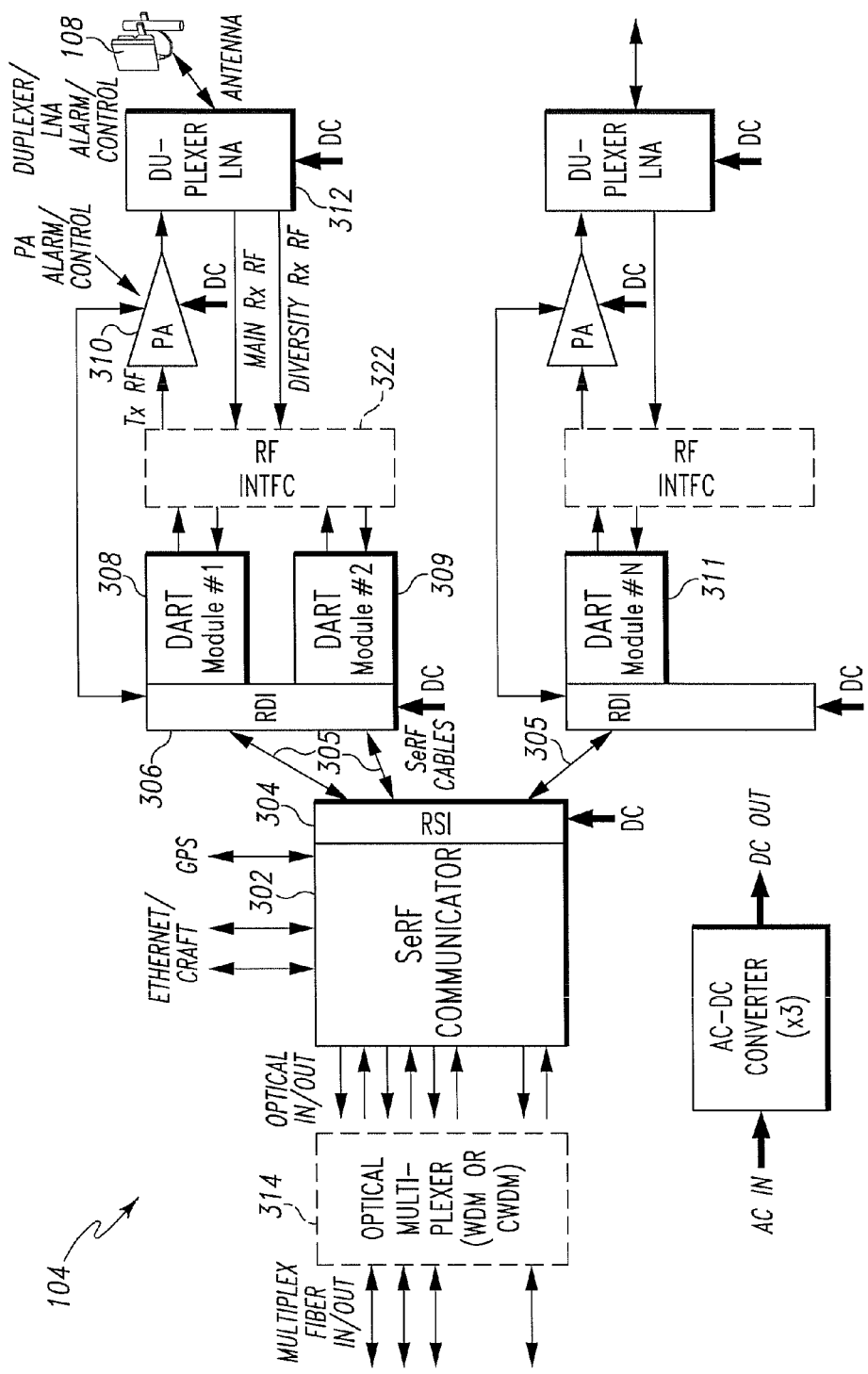
FIG. 3 illustrates a schematic view of one embodiment of a remote unit for use in the system of FIG. 1.

FIG. 3 is a schematic diagram of one embodiment of a remote unit 106 for use in a modular wireless communications platform. Remote unit 106 has a SeRF communicator 302, a SeRF interface 304, at least one DART interface 306. In this embodiment, DART modules 308, 309, 311, power amplified 310, duplexer/linear amplifier 312, and optical multiplex module 314 are all installed in remote unit 106 which is connected to antenna 108.

SeRF communicator 302 is designed and performs similar to SeRF communicator 202 of host unit 102. Likewise, DART modules 308, 309, 311 have the same features and design options as DART modules 208, 210, 212 of host unit 102.

There is a slight difference from host unit 102, however, in the manner in which SeRF communicator 302 and DART modules 308, 309, 311 are connected. In this embodiment of remote unit 106, SeRF communicator 302 has a SeRF interface 304 which is used to link SeRF communicator to SeRF cables 305. SeRF cables 305 are used to allow DART modules 308, 309, 311 to be physically spaced from SeRF communicator 302 and from other DART modules. SeRF cables 305 connect to DART interface 306. DART modules 308 connected to DART interface 306 and communicate with SeRF communicator 302 through DART interface 306 over SeRF cables 305 and through SeRF interface 304. In another embodiment, SeRF interface 304, and SeRF cables 305 are eliminated and DART interface 306 is integrated into SeRF communicator 302.

DART modules 308 perform similar to DART module 208, except the ultimate destination/origination of the signals to/from DART modules 308 is antenna 108 and not base station 101 as in host unit 102. Optical multiplex module 314 also performs similarly to optical multiplex module 214 of host unit 102.

In the transmission direction, once a signal is converted to analog RF by DART module 308, the signal is sent through RF interface 322 (explained below) to power amplifier 310. Power amplifier 310 amplifies the RF signal received from a DART module 308 for output through duplexer/linear amplifier 312 to antenna 108. Similar to DART modules 308, 309, 311, power amplifier 310 is designed for a certain frequency band and technology. Power amplifier 310 is, therefore, removable and is plugged into a power amplifier connector on remote unit 106 which is configured to receive power amplifier 310. Power amplifier connector is configured to couple power amplifier to duplexer/linear amplifier 312 and to DART module 308. Power amplifier 310 also has an alarm and control line that is connected to DART interface 306 for communication to SeRF communicator 302.

Once the signal is amplified by power amplifier 310, duplexer/linear amplifier 312 provides duplexing of the signal which is necessary to connect transmit and receive signals to a common antenna. Duplexer/linear amplifier 312 also provides low noise amplification of received signals and rms power detection of incident and reflected RF power in transmission signal. Similar to DART modules 308, 309, 311 and power amplifier 310, duplexer/linear amplifier 312 is frequency band and technology specific, and is removable. Duplexer/linear amplifier 312 plugs into a connector in remote unit 106 configured to receive duplexer/linear amplifier 312. Furthermore, the connector is configured to couple duplexer/linear amplifier 312 to power amplifier 310 and to antenna 108. Duplexer/linear amplifier 312 also has a control and alarm line that is connected to DART interface 320 for communication to SeRF communicator 302. In this embodiment, the frequency band and technology allow use of a single power amplifier 310 and duplexer/linear amplifier 318 by both DART module 308 and DART module 309. In this embodiment, a RF interface 322 is placed between power amplifier 310, duplexer/linear amplifier 312 and DART modules 308, 309. RF interface 322 provides RF splitting/combining of the RF transmit and receive signals necessary to allow connection of two DART modules 308, 309 to a single power amplifier 310 and duplexer/linear amplifier 312.

Figure 4:
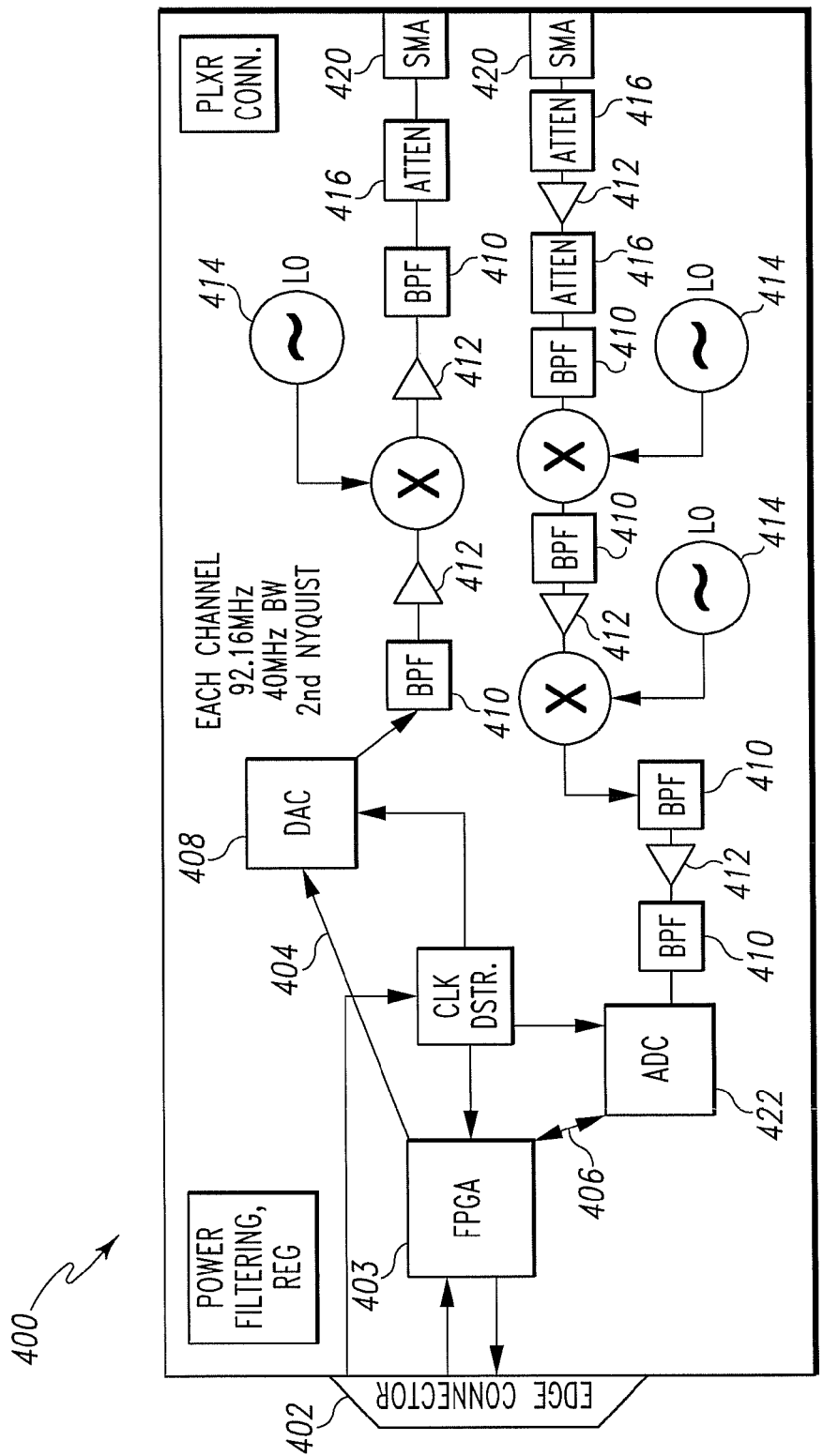
FIG. 4 illustrates a schematic view of one embodiment of a DART module for using in either the host unit of FIG. 2 or the remote unit of FIG. 3.

FIG. 4 shows a schematic view of one embodiment of a DART module 400 for use in either host unit 102 or remote unit 106. There are multiple embodiments of DART module 400 as described above, however, the common elements are described hereafter. DART module 400 has an edge connector 402 for connection to a DART interface. DART module 400 has two main signal paths; a transmission path 404 and a reception path 406. For signals received from a SeRF communicator, DART module 400 forms parallel digital RF data from the incoming SeRF stream, if needed, at FPGA 403. In this embodiment, FPGA 403 is a logic device that is programmed to convert serial digital data into RF sampled data and programmed to convert RF sampled data into serial digital data. DART module 400 then converts the digital signal to analog with digital to analog converter (DAC) 408. Transmission path 404 continues as DART module 400 filters, amplifies and up-converts the analog signal for RF transmission with an assortment of filters 410, amplifiers 412, an oscillator 414, and an attenuator 416. The transmission path exits DART module 400 at an SMA connector 420. The signals travel in the opposite direction down reception path 406, where they are converted from analog to digital and sent to a SeRF communicator. First signals are received at SMA connector 420. DART module 400 then amplifies, down-converts, filters the incoming RF signal with a plurality of filters 410, amplifiers 412, oscillators 414, and attenuators 416. DART module 400 then digitizes the signal with analog to digital converter 422. FPGA 403 then forms a SeRF stream and provides the SeRF stream as parallel digital RF sampled data to a SeRF communicator.

Figure 5:
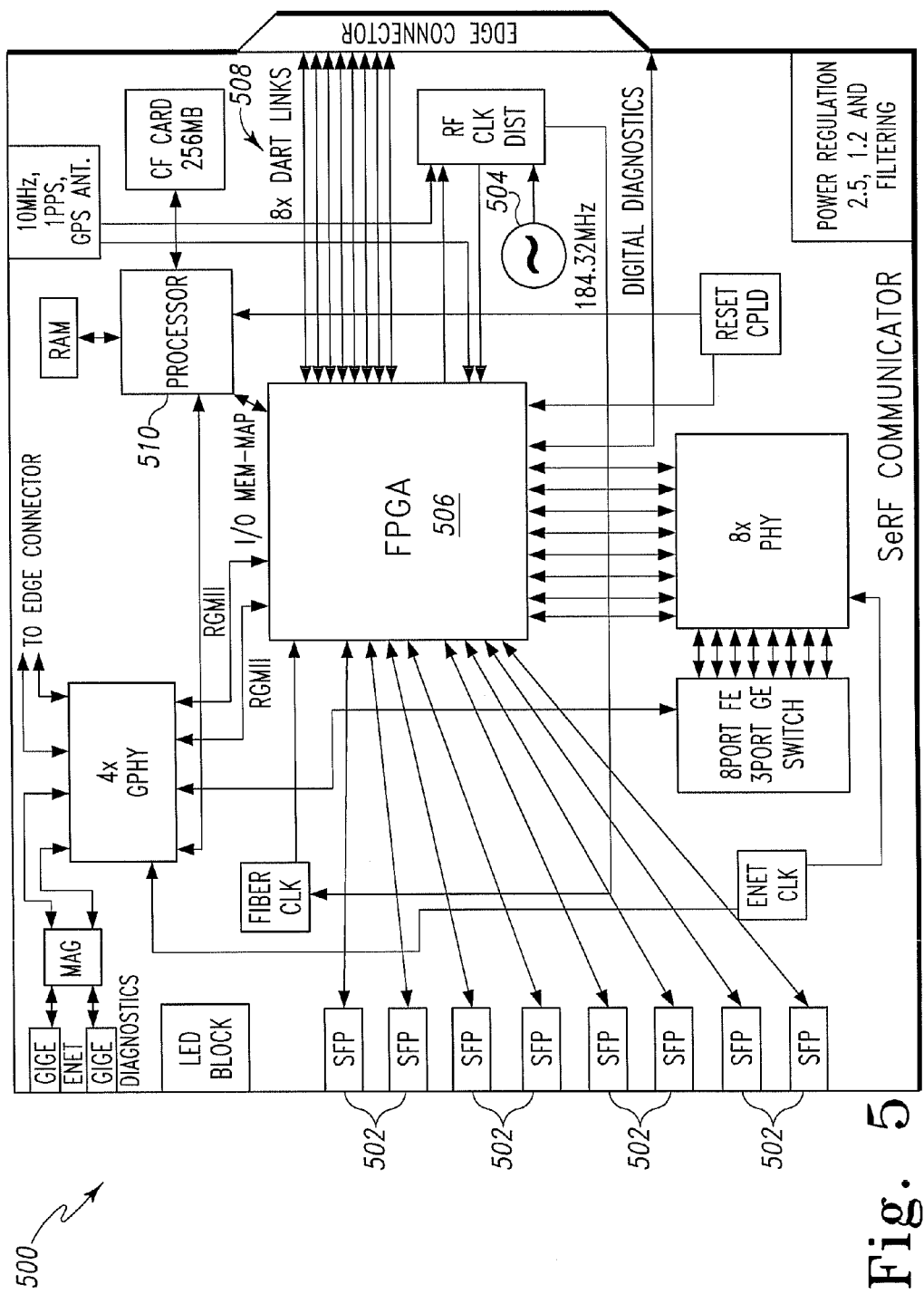
FIG. 5 illustrates a schematic view of one embodiment of a SeRF communicator for use in either the host unit of FIG. 2 or the remote unit of FIG. 3.

FIG. 5 illustrates a schematic view of one embodiment of a SeRF communicator 500 for use in either host unit 102 or remote unit 106. Serial radio frequency communicator 500 has a plurality of optical input/outputs 502, a clock 504, a field programmable gate array (FPGA) 506, a plurality of DART links 508, and a processor 510. In this embodiment, SeRF communicator 500 has eight (8) optical input/outputs 502. Optical input/outputs 502 connect to optical fiber which is used as a transport mechanism, or optical fiber that links SeRF communicator 500 to an optical multiplexer or a millimeter waver or microwave transceiver. Optical input/outputs 502 receiver high speed serial data transmission from another SeRF communicator. In addition, optical input/outputs 502 receive Open Base Station Architecture (OBSAI) protocol data from a baseband unit. In one embodiment, to aid in the ability of optical input/outputs 502 to receive multiple data formats, the signals received from optical input/outputs 502 are transmitted at the same frequency which is set to match the OBSAI protocol. Also, OBSAI data is stripped at the data link layer with a 8B/10B encoder to provide a good ones and zeros balance and remove approximately 20 percent of the OBSAID overhead. Finally, 16-bit filler words are used to provide a $24/25^{ths}$ transport ratio and match a 2.94 GBps transport speed to enable transport of OBSAI or SeRF data. The OBSAI protocol data is explained in more detail below with reference to FIG. 6. Optical input/outputs 206, also conform to the optical small form-factor pluggable multi-source agreement. Alternatively, any frequency of signal or shape of connector could be used as is known in the art. SeRF communicator 500 has eight (8) optical input/outputs and DART links 508 for 8 separate DART modules which transmit RF sampled data to/from DART modules.

In one embodiment, DART links 508 and corresponding connectors on a DART interface carry 6 slots of digitized RF payload for reading and writing DART FPGA registers from SeRF FGPA 506. Each slot consists of 16 bits: 15 bits of digitized RF and 1 overhead bit used to transfer FPGA register data. The slots are framed in groups of 6 16-bit words, with each slot repeating at the sampling rate of 15.36M samples per second. A "superframe" of 32 frames encapsulates the data payload and provides synchronization. Thus, in this embodiment DART links 508 are 16-bit parallel data streams. In another embodiment, DART links 508 are serial.

FPGA 506 has eight SERDES to serializer and deserializers each data stream. Thus, there is one SERDES for each DART link 508 and optical input/output 502.

In one direction, SeRF communicator 500 receives incoming SeRF streams over DART links 508 from DART modules, assembles data frames, and sends an outgoing optical serial data stream through optical input/outputs 502. In the other direction, SeRF communicator 500 receives an optical serial data stream from another SeRF communicator at optical input/outputs 502. SeRF communicator 500 then disassembles the frames of the serial data stream, and provides SeRF streams over DART links 508 to DART modules. SeRF communicator 500 also performs splitting and summing for digital simulcast, and provides a user interface for alarm, status, or configuration management. SeRF communicator 500 also provides bi-directional conversion to/from OBSAI protocol data received at optical input/outputs 502 from/to RF sampled data for DART modules. Additionally, SeRF communicator 500 has at least one RJ-45 connector 216 for receiving IP packets. In one embodiment, RJ-45 connector 216 supports Gigabit Ethernet.

Figure 6:
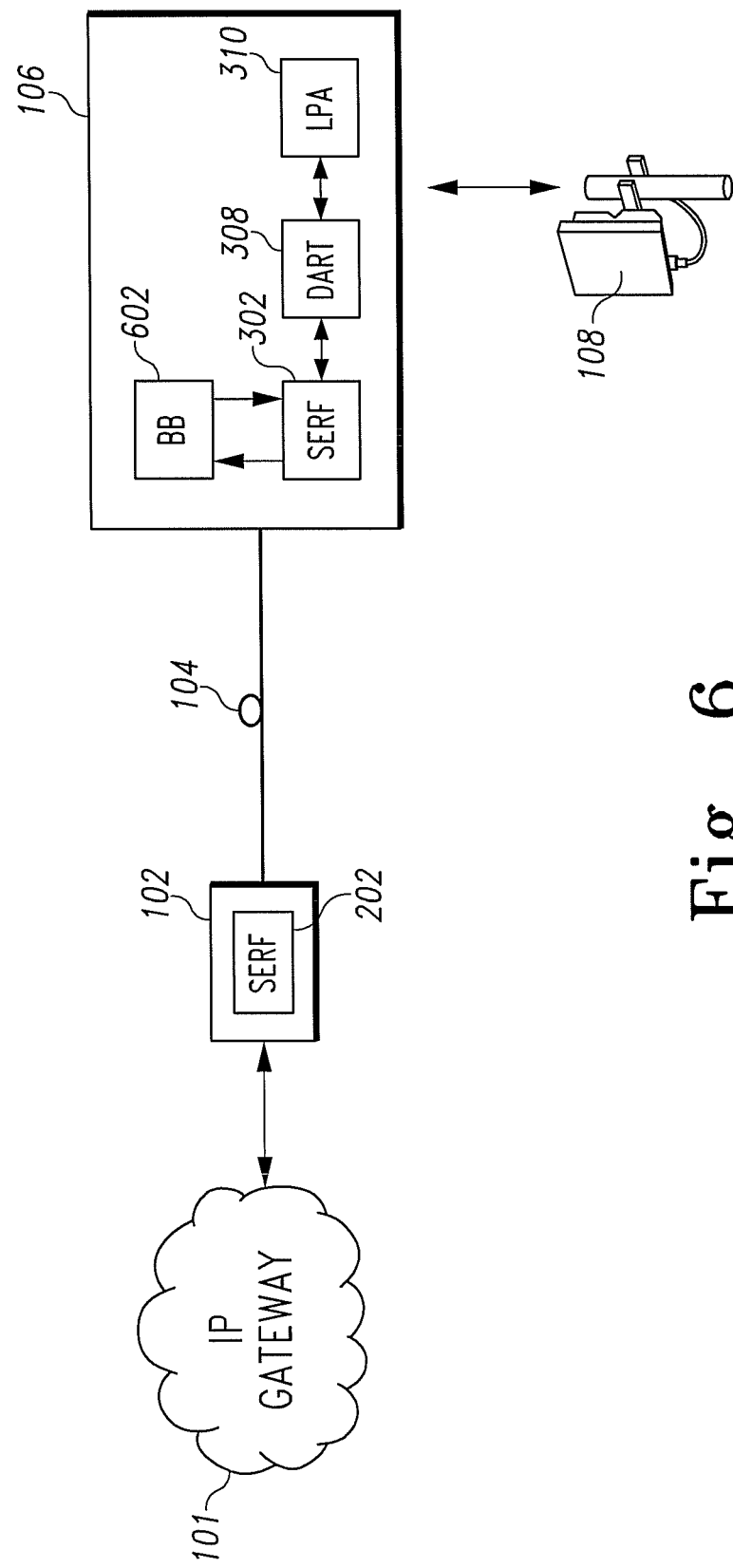
FIG. 6 illustrates another configuration of the system of FIG. 1.
Figure 7:
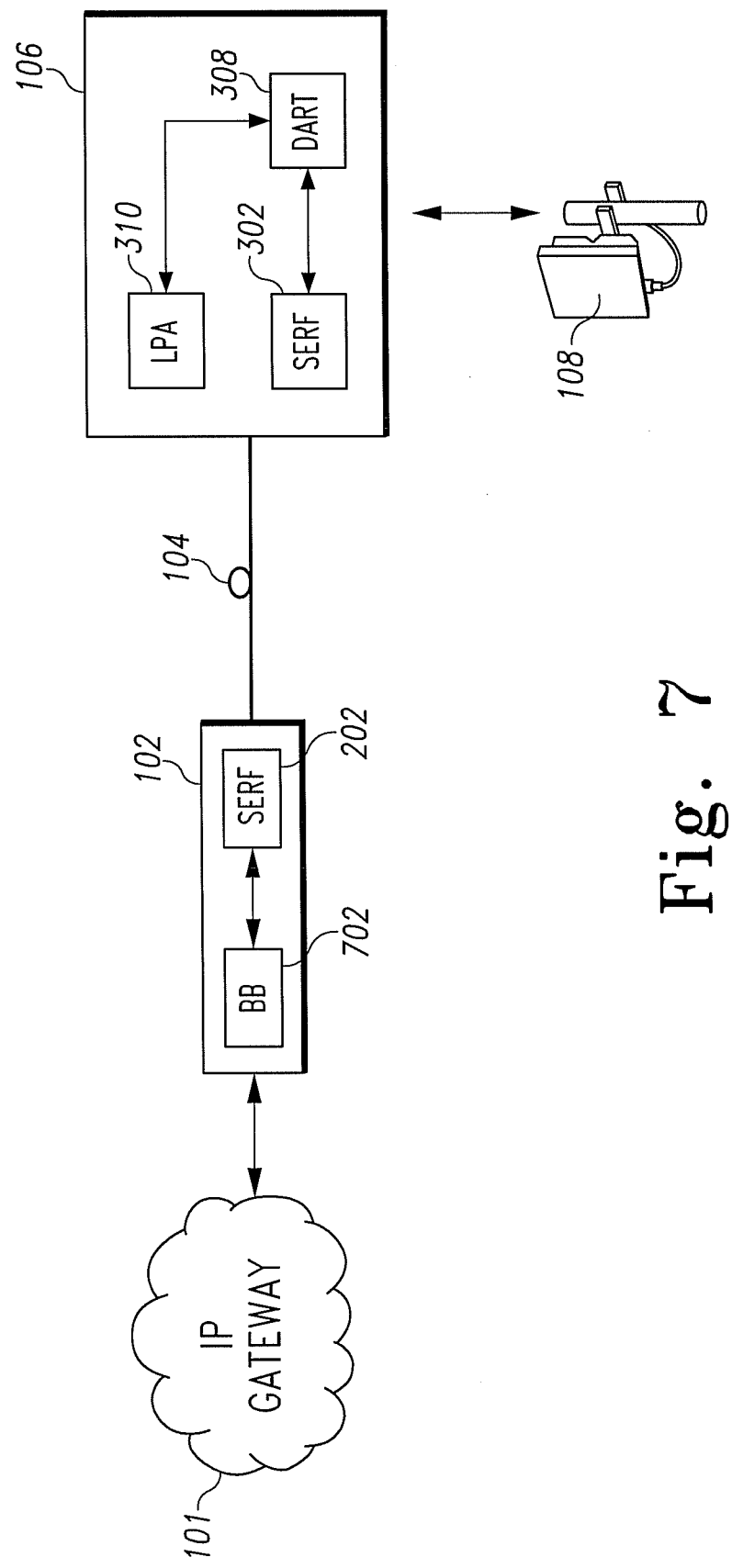
FIG. 7 illustrates yet another configuration of the system of FIG. 1.

Along with being configurable to communicate on different frequency band/sub-bands and with different technologies, host unit 102 and remote unit 106 are configurable to perform more or less of the wireless processing of the RF signal. Host unit 102 and remote unit 106 are configurable into three different functional configurations. The first configuration is illustrated in FIG. 1 and has host unit 101 and remote unit 106 functioning as a range extender for base station 101. In this configuration, fronthaul data is transmitted between host unit 102 and remote unit 106. The second configuration is illustrated in FIG. 6, and has backhaul data transmitted between host unit 102 and remote unit 106. In this configuration remote unit 106 performs the functionality of a base station. The third configuration is illustrated in FIG. 7 and has 'midhaul' data transmission between host unit 102 and remote unit 106. In this embodiment, 'midhaul' data refers to OBSAI protocol data or similar partially processed wireless signals. Each of the three configurations will now be explained in further detail.

Referring back to FIG. 1, system 100 shows one configuration for connection of host unit 102 and remote unit 106 in which remote unit 106 functions as a range extender. In this option, base station 103 contains all necessary components to convert IP packets received from an Internet gateway into an analog bit stream for transmission over antenna 108. Except for needed amplification, the signal is ready for transmission over antenna 108 once sent by base station 103. Host device 102 and remote device 106 do not perform any further processing on the data except what is required to send and receive the data over long range transmission. Host unit 102 contains the components as illustrated in FIG. 2 and receives the analog signal from base station 103 at the DART module matching the analog signal frequency band and technology. Host unit 102 converts the signal and transmits the data over transport mechanism 104. Remote unit 106 contains the components as shown in FIG. 3. Remote unit 106 receives the signal from transport mechanism 104 and sends the data to the DART module matching the frequency band and technology. The signal is then converted and transmitted over antenna 108 to mobile users.

FIG. 6 shows another configuration of a system 100 where base station functionality is performed at remote unit 106. This configuration provides increased capacity to a network of antennas by allowing each remote unit 106 to function as a base station. In this embodiment of system 100, IP data is not processed by a base station before sending to remote unit 106. Instead IP data is received at host unit 102 directly from IP gateway 101. IP data is received at an RJ-45 connector on SeRF communicator 202 of host unit 102. In this configuration, therefore, the signal does not travel through DART module 208, 210, 212 of host unit 102. The IP data is converted to a serial optical stream and transmitted over transport mechanism 104 to remote unit 106. Remote unit 106 receives the IP data at SeRF communicator 302.

Remote Unit 106, in this embodiment, has a baseband unit 602 which is connected to a slot of DART interface 306. In this configuration, baseband unit 602 is in fact a remote WiMax base station which replaces the functionality of base station 103 in the first configuration. SeRF communicator 302 converts the packetized optical data received into 25-75 Mbps data and sends the data over to baseband unit 602. Baseband unit 602 performs baseband processing to put the IP data onto a channel. Baseband unit 602 also creates the protocol and modulation type for the channel. Baseband unit 602 then converts the data to match the OBSAI protocol. This OBSAI data is sent back into an optical input/output 502 of SeRF communicator 302. SeRF communicator 302 uses software to convert the OBSAI protocol data into digital RF sampled data and sends the digital RF data to DART module 308 for transmission over antenna 108. In another embodiment, baseband unit 602 converts IP data to/from common public radio interface (CPRI). Alternatively, any digital baseband protocol, including standard and proprietary protocols, or any software defined radio interface could be used by baseband unit 602 and SeRF communicator 302.

FIG. 7 illustrates yet another configuration of a system 100 in which remote unit 106 performs the functionality of a base station, and the baseband processing is performed prior to transmission by host unit 102. In this embodiment, IP data is received at a baseband unit 702 which converts the IP data into data conforming to the OBSAI protocol. Alternatively, any of the protocols listed with respect to FIG. 6 could be used. The OBSAI protocol data is sent to host unit 102 and OBSAI protocol data is transmitted over transport mechanism 104. In another embodiment, the OBSAI conversion is done in SeRF 202 of host unit 102 before the serial data is transmitted to remote unit 106. Here again, DART module 208 is not used at host unit 102, since the data has not been converted to RF yet. The OBSAI protocol data is received by remote device 106 at SeRF communicator 302. SeRF communicator 302 converts the OBSAI protocol data into digital RF sampled data and interfaces with DART 308. DART 308 converts the data to analog RF and the signal is sent over antenna 108.

Since host unit 102 and remote unit 106 have multiple input/outputs and can have multiple types of DART modules connected to each, host unit 102 and remote unit 106 are configured to multiplex different functional configurations through different input/outputs simultaneously. Thus, in one embodiment, a first input/output of host unit 102 and remote unit 106 function as a range extender for a base station. A second input/output of host unit 102 and remote unit 106 function to transmit 'midhaul' data. At the same time a third input/output of host unit 102 and remote unit 106 functions to transmit backhaul data and remote unit 106 performs baseband processing upon the data.

The modular design of modular wireless communications protocol allows many different combinations of transport mechanisms, frequency bands, communication technologies, and processing functionality to operate simultaneously on the same host unit and remote unit.

Figure 8:
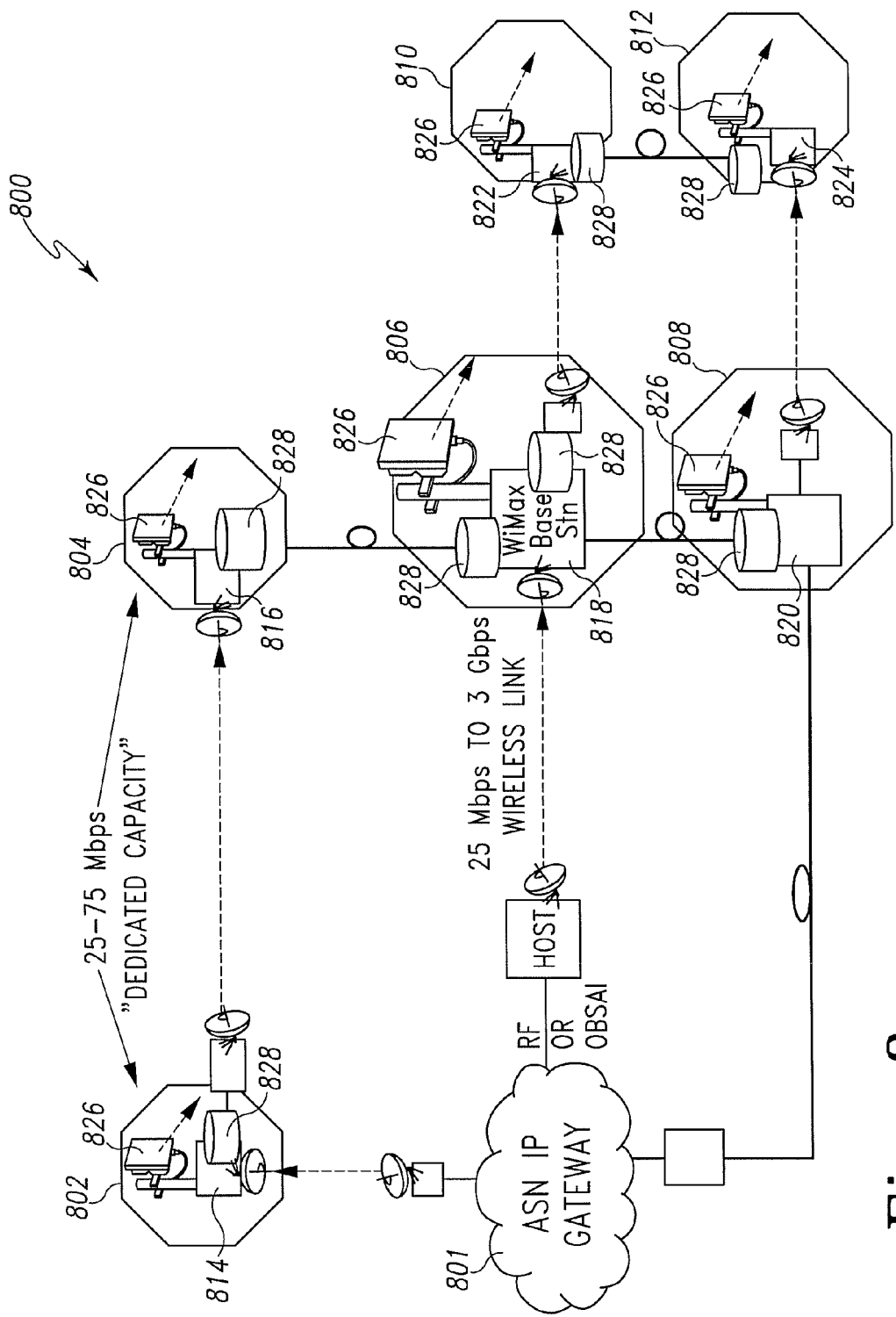
FIG. 8 illustrates one embodiment of a distributed base station system.

Placing a base station at a remote wireless communication stations such as described with the configuration of FIG. 6 allows service providers to set up a distributed base station system. FIG. 8 illustrates one embodiment of a distributed base station system 800. System 800 has a central node 801 having an IP gateway and a plurality of remote wireless communication stations 802, 804, 806, 808, 810, 812. Each remote station 802, 804, 806, 808, 810, 812 includes a remote unit 814, 816, 818, 820, 822, 824, an antenna 826, and a router 828. In this embodiment, remote unit 818 and remote unit 820 are configured into a WiMax compatible base station. In another embodiment, all remote units 814, 816, 818, 820, 822, 824 are configured into PCS cellular base stations. Alternatively, any number of remote units 814, 816, 818, 820, 822, 824 could be configured into a base station for any of the technology or frequency bands described with respect to system 100. Each remote station 802, 804, 806, 808, 810, 812 functions similarly, except that they will vary based on the configuration of their respective remote unit 814, 816, 818, 820, 822, 824.

Distributed base station system 800 has many advantages over traditional centralized base station systems. For example, remote stations 806, 806 which are equipped with a base station do not need to transmit signals back to central node 801 for base station processing. Instead, when an RF signal is received via antenna 826 at remote station 806, for example, remote station 806 processes the RF signal with remote unit 818, which is configured as a base station. Processing the RF signal forms a second RF signal which is then routed toward the destination of the RF signal. In this embodiment, the RF signal received at remote unit 806 is from a first mobile device which is in communication with a second mobile device which is the destination of the second RF signal. In another embodiment, the RF signal is received from a fixed internet user and the destination of the second RF signal is on the internet via IP gateway at central node 801. In this embodiment, the second mobile device is within transmission range of remote station 812. Thus, after processing by remote unit 818 at remote station 806, routers 828 at remote stations 806, 810, 812 route the second RF signal through remote station 810 to remote station 812. Thus, distributed base station system 800 simplifies and speeds up the processing of wireless signals.

In addition, there are many other advantages of a distributed base station system. For example, since each remote station 802, 804, 806, 808, 810, 812 includes a router, a best path is found to the from the origination remote station to the destination remote station. This decreases the latency of communication transmission, and also reduces unnecessary network traffic. In addition, in one embodiment where each remote station 802, 804, 806, 808, 810, 812 is equipped with a base station, each remote station 802, 804, 806, 808, 810, 812 obtains dedicated capacity to the system. Dedicated capacity refers the allocation of an unvarying amount of bandwidth to each remote station 802, 804, 806, 808, 810, 812. For example, in one embodiment, each remote station 802, 804, 806, 808, 810, 812 is allocated 25 Mbps of bandwidth. This is not possible in previous systems, because each remote station shares the capacity of a single central base station.

Figure 9:
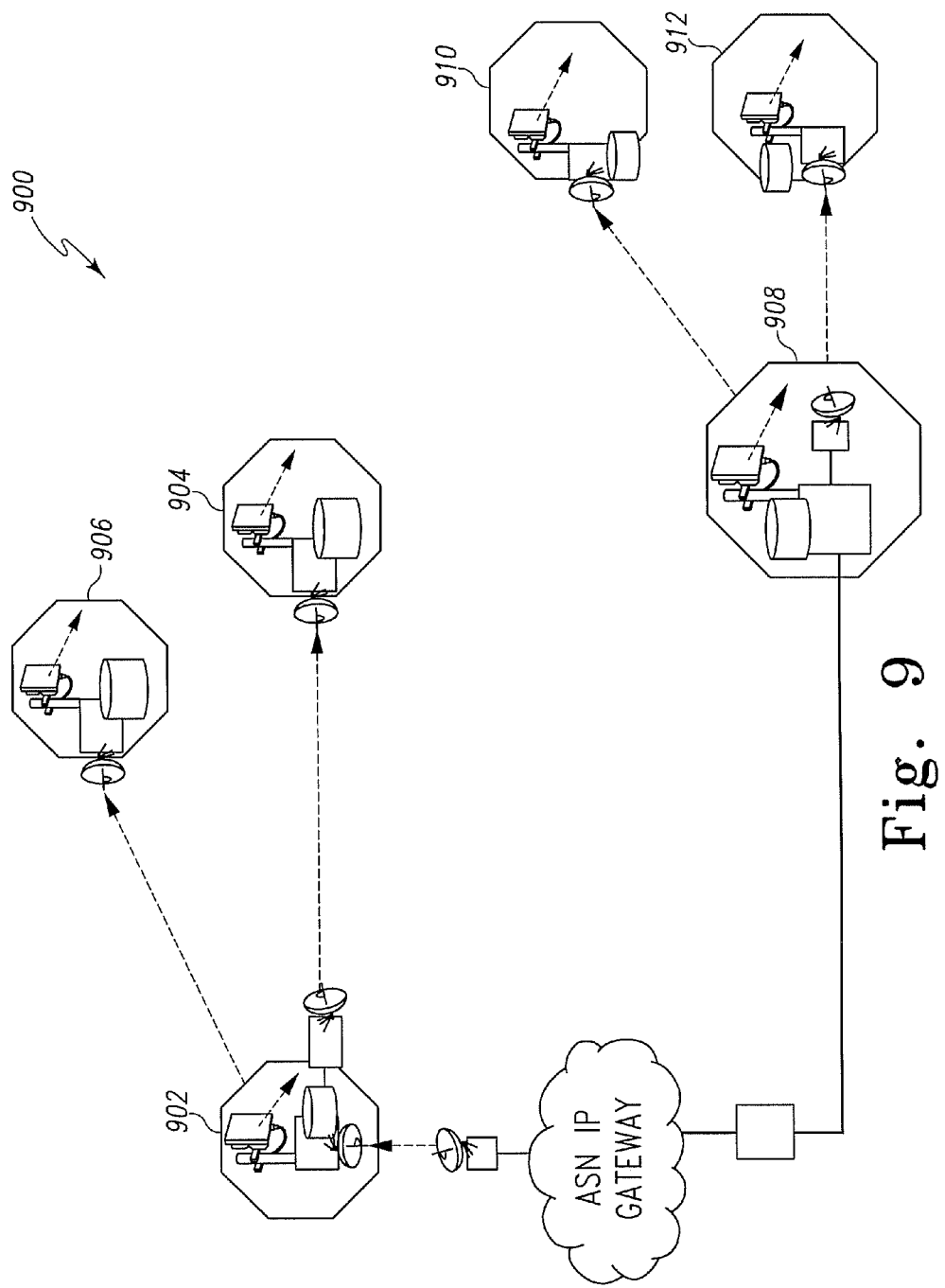
FIG. 9 illustrates another embodiment of a distributed base station system.

In one embodiment, remote stations 802, 804, 806, 808, 810, 812 are set up in a ring configuration as shown in FIG. 8. The ring structure is advantageous, because a ring configuration allows multiple paths to be found to each remote station 802, 804, 806, 808, 810, 812. Thus, there are more options for a best path to be found to each remote device 802, 804, 806, 808, 810, 812, and congested areas are more easily avoided. In another embodiment, shown in FIG. 9, remote stations 902, 904, 906, 908, 910, 912 are arranged into tree configurations. Tree configurations are advantageous, because they reduce the complexity of the network and the amount of communication links that must be established. Tree configurations, however, still provide reduced latencies by allowing signals to be routed through the local hubs (e.g. remote station 902 and 908) and not requiring transmission to central hub 901.

In yet another embodiment, a plurality of remote stations is set up in a daisy chain configuration. Alternatively, any combination of ring, tree, or daisy chain configurations could be used to network a plurality of remote stations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A distributed base station system for high speed data transmission comprising:
 a host unit;
 a plurality of remote antenna units communicatively coupled to the host unit;
 wherein the host unit is configured to send downlink RF sampled data to the plurality of remote antenna units and the plurality of remote antenna units are configured to transmit an RF signal based on the downlink RF sampled data;
 wherein the plurality of remote antenna units are configured to send uplink RF sampled data to the host unit based on RF signals received;
 wherein each of the plurality of remote antenna units is coupled to a co-located, network layer router, and a first of the plurality of remote antenna units is coupled to a co-located remote base station;
 wherein the plurality of remote antenna units are coupled to each other and are arranged into a network, and wherein the network layer routers are configured to route data corresponding to RF signals transmitted and received at the plurality of remote antenna units, to and from the remote base station over the network; and
 wherein the first remote antenna unit is configured to:
  generate a fourth RF signal and a transport signal representing a duplicate of the fourth RF signal;
  transmit the fourth RF signal from the first remote antenna unit; and
  send the transport signal through the network such that the transport signal is routed to a second of the plurality of remote antenna units, wherein the duplicate of the fourth RF signal is transmitted from the second remote antenna unit.

2. The distributed base station system of claim 1, wherein the plurality of remote antenna units are arranged in a tree configuration.

3. The distributed base station system of claim 1, wherein the plurality of remote antenna units are arranged in a ring configuration.

4. The distributed base station system of claim 1, wherein each of the plurality of remote antenna units is coupled to a remote base station.

5. The distributed base station system of claim 1, wherein the system transports data using a protocol that is compliant with IEEE 802.16.

6. The distributed base station system of claim 1, further comprising:
 a fiber optic transport mechanism between two of the plurality of remote antenna units.

7. The distributed base station system of claim 1, further comprising:
a millimeter wave transceiver configured to transport data between two of the plurality of remote antenna units.

8. A method of transmitting a wireless communication signal comprising:
receiving a first RF signal at a first remote wireless communication station;
routing a first transport signal based on the first RF signal to a second remote wireless communication station via a network layer router co-located with the first remote wireless communication station;
receiving the first transport signal at a co-located, network layer router at the second remote wireless communication station;
processing the first transport signal by a base station at the second remote wireless communication station;
receiving a second RF signal at the first remote wireless communication station;
sending a second transport signal to a host unit based on the second RF signal
generating a fourth RF signal at the base station of the second remote wireless communication station;
transmitting the fourth RF signal from an antenna of the second remote wireless communication station;
generating a fourth transport signal representing a duplicate of the fourth RF signal;
sending the fourth transport signal to the first remote wireless communication station; and
transmitting a duplicate of the fourth RF signal from an antenna at the first remote wireless communication station.

9. The method of claim 8, further comprising:
sending a third transport signal from the host unit to the first remote wireless communication system; and
transmitting a third RF signal from the remote wireless communication station based on the third transport signal.

10. The method of claim 8, wherein receiving the first RF signal receives the first RF signal via an antenna at the first remote wireless communication station.

11. The method of claim 8, wherein transmitting further comprises:
transmitting the fourth RF signal to a mobile device.

12. The method of claim 8, further comprising:
processing a fifth RF signal by a base station at the first remote wireless communication station to form a sixth RF signal; and
transmitting the sixth RF signal from an antenna at the first remote wireless communication station.

13. The method of claim 8, wherein the first transport signal is transported using a protocol that is compliant with IEEE 802.16.

14. The method of claim 8, wherein routing the first transport signal further comprises:
routing the first transport signal through a third wireless communication station and then to the second remote wireless communication station.

15. A method of transmitting a wireless communication signal comprising:
receiving a first RF signal at an antenna of a first remote wireless communication station;
processing the first RF signal by a base station at the first remote wireless communication station;
generating a second RF signal and a first transport signal representing a duplicate of the second RF signal at the first remote wireless communication station;
transmitting the second RF signal from the antenna at the first remote wireless communication station;
routing the first transport signal through a network of remote wireless communication stations to a second remote wireless communication station, each remote wireless communication station having a co-located, network layer router;
transmitting a duplicate of the second RF signal based on the first transport signal from the antenna of the second remote wireless communication station;
receiving a third RF signal at the first remote wireless communication station; and
sending a second transport signal to a host unit based on the second RF signal.

16. The method of claim 15, wherein the first transport signal is transported using a protocol that is compliant with IEEE 802.16.

17. The method of claim 15, wherein transmitting further comprises:
transmitting the second RF signal to a mobile device.

18. The method of claim 15, wherein receiving the first RF signal receives the first RF signal via an antenna at the first remote wireless communication station.

19. A remote wireless communication station for transmitting high speed wireless data comprising:
a remote unit;
a router co-located with and coupled to the remote unit;
a baseband unit co-located with and coupled to the remote unit; and
an antenna coupled to the remote unit;
wherein the remote unit is configured to send uplink RF sampled data to a host unit based on RF signals received, and is configured to route data corresponding to RF signals transmitted and/or received over a network of remote units of which the remote unit is a member;
wherein the baseband unit is configured to generate a first RF signal and a transport signal representing a duplicate of the first RF signal, wherein the remote unit is configured to:
process the first RF signal to be transmitted from the antenna coupled to the remote unit; and
send the transport signal over the network to be routed to a second of the remote units, such that a duplicate of the first RF signal can be transmitted from the second of the remote units.

20. The remote wireless communication station of claim 19, wherein the remote unit is configured to transmit data using a protocol compliant with IEEE 802.16.

* * * * *